(12) United States Patent
Benhammadi

(10) Patent No.: US 12,481,554 B2
(45) Date of Patent: Nov. 25, 2025

(54) EEPROM EMULATION METHOD

(71) Applicant: STMicroelectronics International N.V., Geneva (CH)

(72) Inventor: Jawad Benhammadi, Pont de Claix (FR)

(73) Assignee: STMicroelectronics International N.V., Geneva (CH)

( * ) Notice: Subject to any disclaimer, the term of this patent is extended or adjusted under 35 U.S.C. 154(b) by 21 days.

(21) Appl. No.: 18/430,259

(22) Filed: Feb. 1, 2024

(65) Prior Publication Data

US 2024/0264905 A1    Aug. 8, 2024

(30) Foreign Application Priority Data

Feb. 2, 2023   (FR) .................................. FR2301000

(51) Int. Cl.
*G06F 11/10* (2006.01)

(52) U.S. Cl.
CPC ...... *G06F 11/1068* (2013.01); *G06F 11/1044* (2013.01)

(58) Field of Classification Search
None
See application file for complete search history.

(56) References Cited

U.S. PATENT DOCUMENTS

| | | | |
|---|---|---|---|
| 9,250,990 B2* | 2/2016 | Motwani | G06F 11/1048 |
| 2006/0248434 A1 | 11/2006 | Radke et al. | |
| 2008/0072117 A1 | 3/2008 | Syzdek et al. | |
| 2010/0169740 A1* | 7/2010 | Jagasivamani | G11C 13/0004 714/763 |
| 2011/0252206 A1 | 10/2011 | Pyeon | |
| 2013/0039129 A1 | 2/2013 | Radke et al. | |
| 2013/0308377 A1* | 11/2013 | Choi | G11C 13/0009 365/163 |
| 2014/0195876 A1* | 7/2014 | Nachimuthu | G11C 5/04 714/766 |
| 2015/0039805 A1 | 2/2015 | Backhausen et al. | |
| 2015/0228338 A1 | 8/2015 | Manda et al. | |
| 2017/0286216 A1* | 10/2017 | Kozhikkottu | G06F 11/1068 |
| 2018/0144794 A1* | 5/2018 | Lee | G11C 29/42 |
| 2019/0102088 A1* | 4/2019 | Fang | G06F 12/0246 |

(Continued)

FOREIGN PATENT DOCUMENTS

| CN | 110045927 A | 7/2019 |
|---|---|---|
| DE | 102016115177 A1 | 2/2018 |

OTHER PUBLICATIONS

C. H. Lam, "Phase Change Memory and its intended applications," 2014 IEEE International Electron Devices Meeting, San Francisco, CA, USA, 2014, pp. 29.3.1-29.3.4, (Year: 2014).*

(Continued)

*Primary Examiner* — Daniel F. McMahon
(74) *Attorney, Agent, or Firm* — Crowe & Dunlevy LLC

(57) ABSTRACT

EEPROM emulation is provided in a phase-change memory of a circuit integrating a microprocessor. A granularity for writing into lines of the phase-change memory is defined according to a size of data packets to be written. A first error correction code calculated by a program executed by said microprocessor is associated with each data packet. Several data packets and their associated first error correction codes are then stored in a same line of the phase-change memory data packet.

11 Claims, 3 Drawing Sheets

(56) References Cited

U.S. PATENT DOCUMENTS

2019/0155528 A1* 5/2019 Bedeschi ............... G11C 13/02
2020/0365204 A1* 11/2020 Bai .................... G11C 13/0061

OTHER PUBLICATIONS

J.-J. Wu et al., "A Sequential Write Scheme for Phase Change Memory Based Serial Interface EEPROM," 2019 China Semiconductor Technology International Conference (CSTIC), Shanghai, China, 2019, pp. 1-3, (Year: 2019).*

INPI Search Report and Written Opinion for priority application, FR 2301000, report dated Aug. 29, 2023, 9 pgs.

* cited by examiner

EEPROM EMULATION METHOD

PRIORITY CLAIM

This application claims the priority benefit of French Application for Patent No. 2301000, filed on Feb. 2, 2023, the content of which is hereby incorporated by reference in its entirety to the maximum extent allowable by law.

TECHNICAL FIELD

The present disclosure generally concerns EEPROM emulation methods and memory circuits implementing these methods.

BACKGROUND

Many applications require a non-volatile data storage during their use. Memories of electrically-erasable programmable read-only memory (EEPROM) type may be used for this purpose. These EEPROMs are often external to the integrated circuits which use them.

It has already been provided to emulate the operation of an EEPROM in a flash memory integrated to a system on chip. These solutions are dedicated to flash memories and cannot be transposed to other memory technologies.

There exists a need to obtain a device integrating a memory operating similarly to an EEPROM, which is compatible with another memory technology than a flash memory. More particularly, there exists a need for a solution to emulate an EEPROM in a phase-change memory.

SUMMARY

An embodiment provides an EEPROM emulation method in a phase-change memory of a circuit integrating a microprocessor. The method comprises the following steps: defining a granularity for writing into lines of the phase-change memory according to a size of data packets to be written; associating, with each data packet, a first error correction code calculated by a program executed by said microprocessor; and storing the first error correction code of each data packet in a same line as the data packet.

According to an embodiment, each line of the phase-change memory has a capacity of storing at least two data packets associated with their first error correction codes.

According to an embodiment, each line of the phase-change memory comprises a data zone and a zone of storage of a second error correction code calculated by a hardware operator for the corresponding line, the storage of said second error correction code being deactivated when the line is used in EEPROM emulation.

According to an embodiment, the data packets and their first error correction codes are stored in said data zone.

According to an embodiment, each first error correction code is written after the data packet to which it corresponds.

According to an embodiment, the data packets and their respective first error correction codes are written one after the other.

According to an embodiment, the granularity of the writing depends on a parameter that can be modified by a user.

An embodiment provides an integrated circuit, comprising a phase-change memory and a microprocessor, configured to implement such a method.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
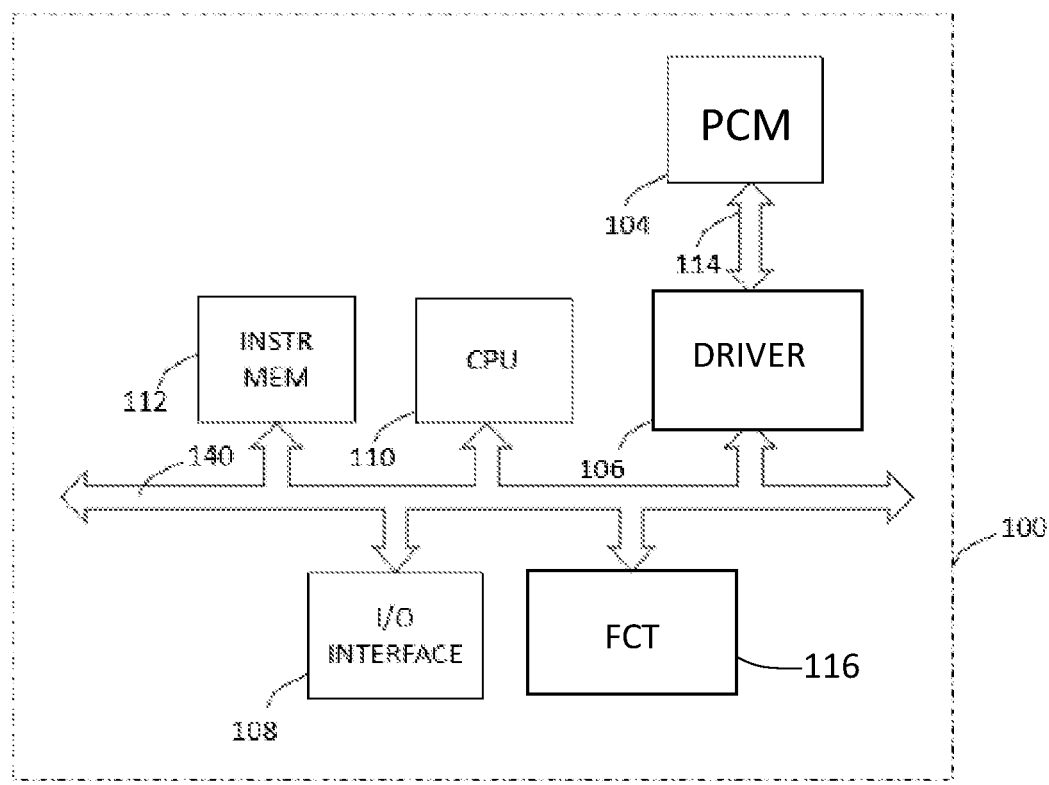
FIG. 1 shows an example of integrated circuit of the type to which the described embodiments apply.

FIG. 1 shows an example of an integrated circuit of the type to which the described embodiments apply.

More precisely, FIG. 1 shows an example of an integrated circuit device 100 integrating a phase-change memory 104 (PCM). The phase-change memory 104 (PCM) is capable of communicating, over a communication bus 114, with a driver circuit 106 (DRIVER) configured to write or read data into or from memory 102. Driver circuit 106 comprises, for example, a dedicated hardware circuit which, when it is activated, is configured to calculate an error correction code (ECC) during the writing of each element into memory 102.

Device 100 further comprises, for example, a processing unit 110 (CPU) comprising one or a plurality of processors under control of instructions stored in an instruction memory 112 (INSTR MEM). Instruction memory 112 is, for example, of random access type (RAM). Processing unit 110 and memory 112 communicate, for example, via a system (data, address, and control) bus 140. Memory 102 is coupled to system bus 140 via driver circuit 106 and communication bus 114. Device 100 further comprises an input/output interface 108 (I/O INTERFACE) coupled to system bus 140 to communicate with the outside.

Device 100 may integrate other circuits implementing other functions (for example, one or a plurality of volatile and/or non-volatile memories, other processing units, etc.), symbolized by a functional block 116 (FCT) in FIG. 1.

The described embodiments provide emulating an EEPROM-type memory operation in the phase-change memory 104 of device 100. In other words, a portion of the phase-change memory of integrated circuit 100 is allocated to the storage of data by emulating an EEPROM-type operation.

The emulation of an EEPROM-type operation particularly enables to make device 100 compatible with applications or programs designed to operate with EEPROMs without having to adapt them to the nature of the phase-change memory integrated in the device and to take advantage of a memory technology (phase-change memories) less expensive than the EEPROM technology. In particular, this enables to run applications designed for an operation with an EEPROM with a circuit integrating a phase-change memory and to avoid the use of an external memory.

Among the criteria to be respected by the emulation of an EEPROM operation, there will be noted a need to respect the granularity of the writing, that is, the size of the EEPROM data packets provided by the application. Typically, the word size is one byte or two bytes and these words are gathered (encapsulated) in packets or elements of four, six, or eight bytes. For example, the granularity of the writing depends on the size of the lines of the EEPROM with which the application is provided to operate.

Among the characteristics of a phase-change memory, there will be noted the fact that the latter may be written with a granularity ranging from one byte to the size of a memory line, that is, generally sixteen bytes, or even more. Circuit 106 is thus capable, according to the size of the data to be written, to only address a portion of a line.

As in any memory writing, it is necessary to associate, with each data writing, an error correction code, stored in the same memory line. In a phase-change memory, this error correction code is calculated by circuit 106 in hardware fashion, typically, by a combinational process. Further, it is desired to optimize the cycling, that is, the number of write operations, since this conditions the lifetime of the memory.

Figure 2:
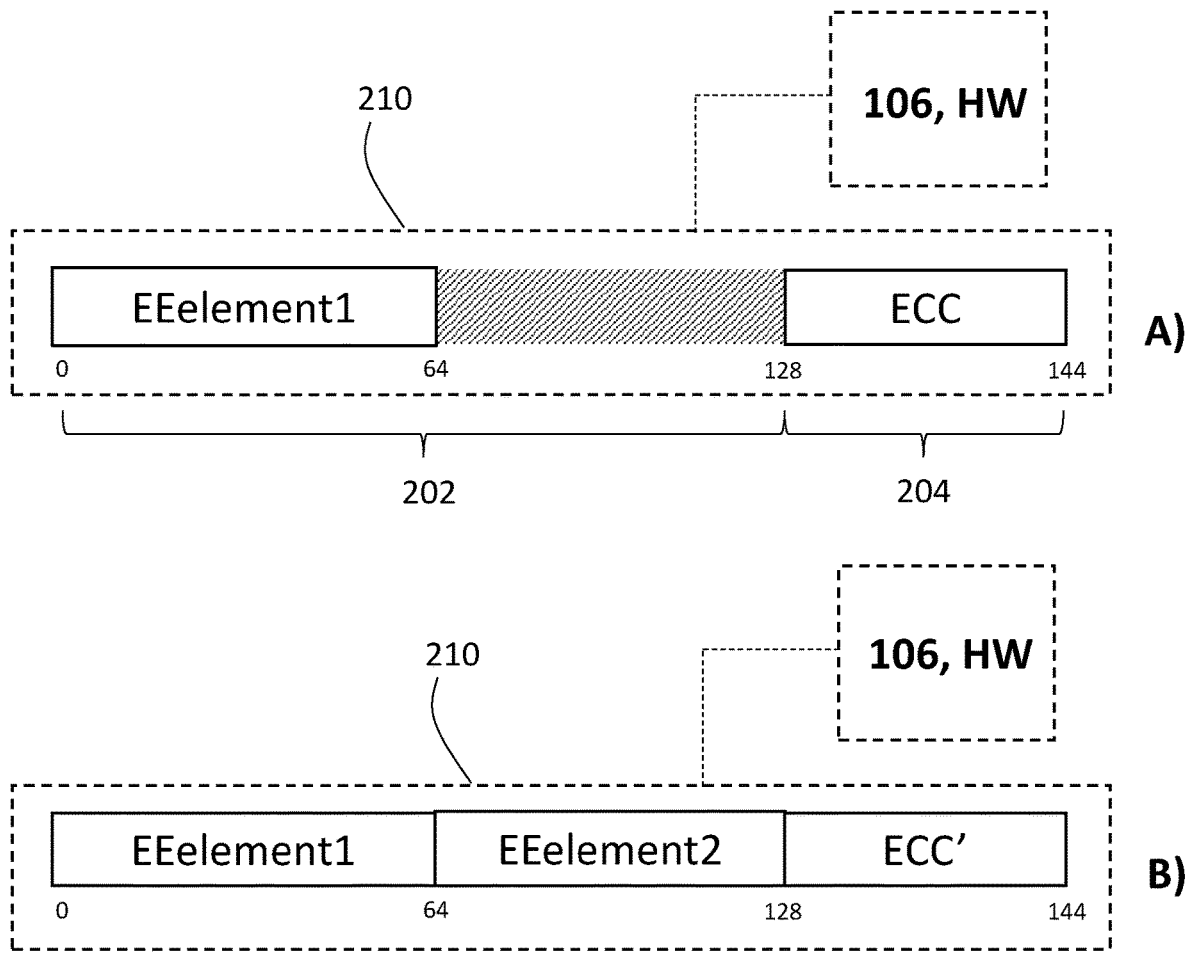
FIG. 2 illustrates the implementation of an example of a usual method of emulation of an EEPROM in a phase-change memory.

FIG. 2 illustrates the implementation of an example of an EEPROM emulation method in a phase-change memory.

The example of FIG. 2 more particularly illustrates the content of a line of a phase-change memory at the end of two steps A) and B) of writing of EEPROM elements or packets. Although a single line 210 is shown, memory 102 comprises several tens, hundreds, or thousands of lines in all or part of which the write method is implemented. In the shown example, each line of the phase-change memory comprises a data zone 202 of 128 bits (16 bytes) and an error correction zone 224 of 16 bits (2 bytes) for storing the error correction code of this data line. The number of bytes simultaneously written into data zone 202 is configurable at the level of circuit 106 by one or a plurality of configuration or user option bytes.

In the example of FIG. 2, it is assumed that it is desired to emulate, in memory 102, a writing of EEPROM-type data packets of 64 bits. Data zone 202 is thus configured to write 8-byte sections.

Step A) of FIG. 2 illustrates the writing of a first element EEelement1 into the 64 first bits of data zone 202 via driver circuit 106. The error correction code ECC associated with the content of data zone 202 (element EEelement1 and content of the next 64 bits) is calculated by circuit 106 and stored in zone 204. At the end of step A, half (in this example) data zone 202 is unused.

A solution would be to provide an emulation to allocate a line 210 of memory 102 to each EEPROM data packet. However, due to the size difference between memory lines 102 and the EPPROM elements, too much memory space would be lost. It could also have been devised to use the phase-change memory according to the size of the EEPROM elements. However, this would not enable to emulate an EEPROM in existing circuits. Further, the size of the EEPROM elements is likely to vary according to the executed application for which an EEPROM operation is desired to be emulated.

The solution illustrated in FIG. 2 (step B) comprises using the rest of data zone 202 to store therein a second EEPROM element EEelement2. Thus, in the example of elements of 8 bytes and of a data zone 202 of 16 bytes, the entire write zone is used. The error correction code of zone 202 must however be recalculated and a new code ECC' is written into the zone 204 of the line by replacing the previous error correction code ECC.

The fact of having to rewrite the error correction code into the same zone 204 when a second EEPROM element is written into a same line decreases by two the number of possible cyclings of data zone 204 of the phase-change memory. This loss of memory lifetime is all the greater as the difference between the size of the EEPROM packets and the size of line 210 is significant. Further, the calculation of the error correction codes being performed by a dedicated hardware circuit, it is complex to modify the operation thereof once brought on production to, if need be, adapt it to the desired EEPROM operation (number of detectable errors and number of correctible errors).

According to the described embodiments, it may be provided, when an EEPROM has to be emulated in a phase-change memory, to calculate in software fashion, the error correction codes of the EEPROM elements to be stored in the phase-change memory and to store each pair of an EEPROM element and of an error correction code one after the other in the data zone of a line of the phase-change memory. Thus, full advantage may be taken of the configurable granularity of the writing into the phase-change memory to, according to the application, have this granularity correspond to the size of the recordings (element+code) which are needed in EEPROM emulation. Further, due to the write granularity configurable in the phase-change memory, the writing of the error correction codes into data zone 202, once the EEPROM packet has been written, is not a problem.

Thereby, the hardware error correction code of zone 204 is no longer useful and its storage can be deactivated in the portion of the phase-change memory allocated to the EEPROM emulation. This enables not to adversely affect the lifetime of the phase-change memory. The price to pay is a decrease in the total available size of a line of the phase-change memory in EEPROM emulation mode, corresponding to zone 204, which cannot be used in EEPROM mode. Indeed, due to the circuit structure, this zone is reserved to the error correction code calculated in hardware fashion.

The size of the portion (number of lines) of the phase-change memory allocated to the storage of "EEPROM" data depends on the application and on the memory capacity which is desired to be reserved to program code in the rest of the phase-change memory and to data in the emulated portion. This configuration is performed by using the usual configuration bytes or user option bytes.

Figure 3:
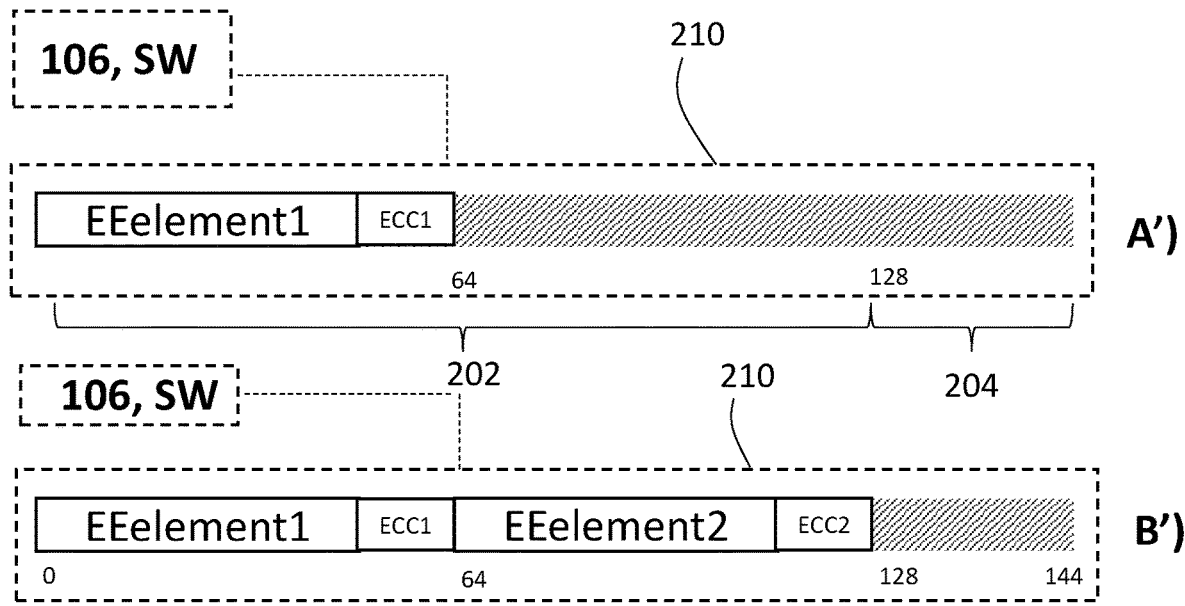
FIG. 3 illustrates the implementation of an EEPROM emulation method according to an embodiment.

FIG. 3 illustrates the implementation of an EEPROM emulation method according to an embodiment.

The example of FIG. 3 more particularly shows two steps A') and B') of writing of EEPROM-type elements in a same line of phase-change memory 104. Each line of the phase-change memory comprises, as in FIG. 2, a data zone 202 and an adjacent zone 204 dedicated to the hardware error correction code. In the example of FIG. 3, zone 204 is, however, no longer written into the memory portion assigned to the EEPROM emulation. For this purpose, the user configuration bytes intended for circuit 106 comprise one or a plurality of bits conditioning the recording of the code calculated in zone 204. It is thus possible to prevent the writing of the error correction code for the lines of the phase-change memory allocated to the EEPROM emulation. As previously mentioned, this enables to take advantage of the configurable granularity of the recordings (element+ associated correction code) without adversely affecting the lifetime of the phase-change memory. When relevant, the configuration bytes also deactivate the hardware error correction code operator.

In FIG. 3, there is assumed the need to store recordings (EEPROM elements+correction code) of 64 bits, that is, up to two EEPROM elements per line 210.

At a step A'), a first EEPROM element EEelement1 is written over the 48 first bits of write zone 202 via driver circuit 106. An error correction code ECC1 associated with the writing of the first EEPROM element EEelement1 is calculated by a program executable (SW) by a microprocessor, for example processing unit 110 or a microprocessor of driver circuit 106, then writes into zone 202 of memory line 102 after the first EEPROM element EEelement1. Error correction code ECC1 for example has a 16-bit size.

At a step B'), a second EEPROM element EEelement2 of 48 bits is written into the 64 next bits adjacent to the space into which the error correction code ECC1 is written. An error correction code ECC2 associated with the writing of the second EEPROM element EEelement2 is calculated by the program executable SW by the microprocessor and then is written into zone 202 of the line after the error correction code ECC1 of the second EEPROM element EEelement2.

Figure 4:
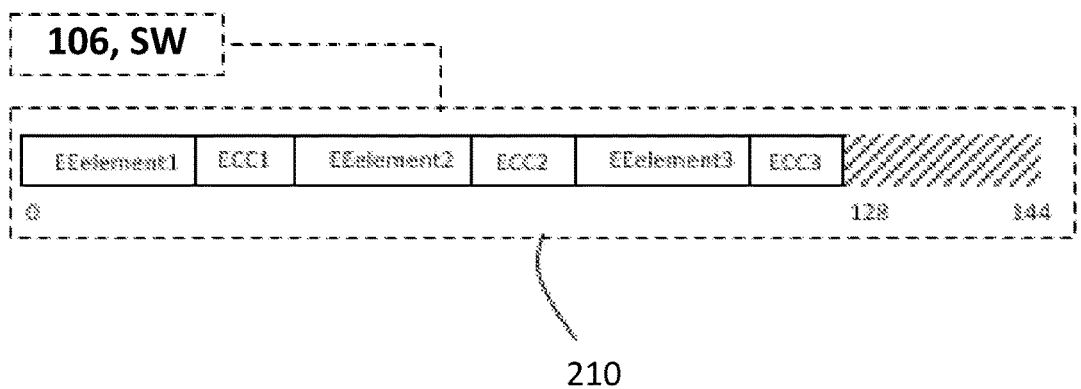
FIG. 4 illustrates the implementation of an EEPROM emulation method according to another embodiment.

FIG. 4 illustrates the implementation of an EEPROM emulation method according to another embodiment.

As compared with the embodiment of FIG. 3, it is assumed that the application requiring the emulation of an EEPROM needs to store smaller packets or elements, for example of 4 bytes (32 bits). Their error correction code then is also smaller (for identical characteristics in terms of number of detectable and correctible errors), for example of 12 bits. Three recordings (EEPROM element+correction code) may then be stored by line 210 of the phase-change memory. The gain in terms of cycling over the solution of FIG. 2, by avoiding rewriting three times into zone 204, then is greater than with the embodiment of FIG. 3. The three EEPROM elements EEelement1, EEelement2, and EEelement3 are successively written one after the other with the interposition of their respective error correction codes ECC1, ECC2, ECC3, calculated in software fashion.

More generally, the number of EEPROM elements capable of being stored per line depends on the size required for the EEPROM recordings and on the size of the line. The provided solution provides a gain in terms of cycling as soon as at least two elements can be stored per line of phase-change memory.

Another advantage is that the use of the program executable by microprocessor SW instead of the usual dedicated hardware circuit HW for the calculation of the error correction codes provides a flexibility in terms of parameterizing of the error correction code (number of detectable errors and number of correctible errors).

Another advantage of the described solution is that its implementation requires no hardware or structural modification of the circuit integrating the phase-change memory.

Thus, it enables to emulate an EEPROM operation in existing integrated circuits comprising a phase-change memory.

Various embodiments and variants have been described. Those skilled in the art will understand that certain features of these various embodiments and variants may be combined, and other variants will occur to those skilled in the art. In particular, the sizes of the EEPROM elements (preferably, 4, 6, or 8 bytes), of the error correction codes calculated in software fashion (preferably, respectively 8, 12, or 16 bits for data packets of 32, 48, or 64 bits), of the data zones 202 (preferably 128 or 256 bits) of the phase-change memory lines, and of the portion (number of lines) of this memory allocated to the EEPROM emulation depend on the application.

Finally, the practical implementation of the described embodiments and variants is within the abilities of those skilled in the art based on the functional indications given hereabove. In particular, regarding the arrangement of the EEPROM elements and of their associated error correction codes in the lines of memory 102, it can be envisaged that all the error correction codes are gathered at the end of data zone 202. Those skilled in the art may also envisage one or a plurality of free spaces between one of the EEPROM elements and the associated error correction code. However, an advantage of a storage of each error correction code after the packet with which it is associated is that this simplifies the addressing in the memory while avoiding, particularly in read mode, having to address the error correction codes separately from the packets to which they correspond.

The invention claimed is:

1. A method of electrically-erasable programmable read-only memory (EEPROM) emulation in a phase-change memory of a circuit integrating a microprocessor, wherein the phase-change memory includes a data zone and an error correction zone, the method comprising the following steps:
    defining a granularity for writing into lines of the data zone of the phase-change memory according to a size of each data packet to be written;
    deactivating the error correction zone during EEPROM emulation;
    associating with each data packet a first error correction code calculated by a program executed by said microprocessor; and
    storing a plurality of data packets and their associated first error correction codes in a same line of the data zone of the phase-change memory.

2. The method according to claim 1, wherein each line of the phase-change memory in the data zone has a capacity of storing at least two data packets and their associated first error correction codes.

3. The method according to claim 1, wherein deactivating the error correction zone comprises deactivating calculation by a hardware operator of a second error correction code for the data zone of said same line.

4. The method according to claim 1, wherein each first error correction code is written after its associated data packet.

5. The method according to claim 1, wherein the plurality of data packets and their associated first error correction codes are written consecutively in said same line of the phase-change memory.

6. The method according to claim 1, wherein the granularity of writing depends on a parameter that can be modified by a user.

7. An integrated circuit, comprising a phase-change memory and a microprocessor, configured to implement the method according to claim 1.

8. A method of electrically-erasable programmable read-only memory (EEPROM) emulation in a phase-change memory of a circuit integrating a microprocessor, wherein the phase-change memory includes a data zone and an error correction zone, the method comprising the following steps:
   deactivating the error correction zone during EEPROM emulation;
   associating a first data packet with a first error correction code calculated by a program executed by said microprocessor;
   storing the first data packet and its associated first error correction code at a first location in a first line of the data zone of the phase-change memory;
   associating a second data packet with a second error correction code calculated by the program executed by said microprocessor; and
   storing the second data packet and its associated second error correction code at a second location in the first line of the data zone of the phase-change memory following the first location where the first data packet and its associated first error correction code are stored.

9. The method according to claim 8, further comprising:
   associating a third data packet with a third error correction code calculated by the program executed by said microprocessor; and
   storing the third data packet and its associated third error correction code at a third location in the first line of the data zone of the phase-change memory following the second location where the second data packet and its associated second error correction code are stored.

10. The method according to claim 8, wherein at least the first and second data packets and their associated first and second error correction codes are stored in said data zone of the line of the phase-change memory.

11. An integrated circuit, comprising a phase-change memory and a microprocessor, configured to implement the method according to claim 8.

* * * * *